(12) United States Patent
Jacquin et al.

(10) Patent No.: US 6,242,376 B1
(45) Date of Patent: Jun. 5, 2001

(54) DIELECTRIC CERAMIC COMPOSITION

(75) Inventors: Jeffrey Richard Jacquin, Albuquerque, NM (US); Rong Fong Huang, Tempe, AZ (US); Randy Elvin Rose, Rio Rancho, NM (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/399,978

(22) Filed: Sep. 21, 1999

(51) Int. Cl.$^7$ ................................................. C04B 35/478

(52) U.S. Cl. ........................... 501/134; 501/127; 501/136

(58) Field of Search ..................................... 501/127, 134, 501/136

(56) References Cited

U.S. PATENT DOCUMENTS

| | | | |
|---|---|---|---|
| 4,866,016 | 9/1989 | Ando et al. | 501/134 |
| 5,024,980 | 6/1991 | Negas et al. | 501/134 |
| 5,147,835 | 9/1992 | Franzak et al. | 501/136 |
| 5,792,379 | 8/1998 | Dai et al. | 252/62.9 |
| 5,830,819 | * 11/1998 | Shikata et al. | 501/127 |

FOREIGN PATENT DOCUMENTS

| | | |
|---|---|---|
| 09052762 | * 2/1997 | (JP) . |
| 10-120460 | 12/1998 | (JP) . |

OTHER PUBLICATIONS

Gui Zhilun et al., "Low–Temperature Sintering Of Lead–Based Piezoelectric Ceramics" *American Ceramic Society*, Jul. 11, 1988, vol. 72, No. 3, pp. 486–491.

\* cited by examiner

*Primary Examiner*—Karl Group

(57) ABSTRACT

An alumina based dielectric ceramic composition comprising a base material and an additive material. The base material is represented by the general formula $(x) Al_2O_3+(y) TiO_2$ wherein x and y are percentages of the total weight of the base material, and x is in the range of about 60 to about 96, more preferably about 94 to about 96, and y is in the range of about 4 to about 40, more preferably about 4 to about 6. In one embodiment the additive material comprises $Nb_2O_5$. In a second embodiment the additive material further comprises at least one additional component selected from the group consisting of $BaCO_3$, $SnO_2$, $Mn_2O_3$, $MnCO_3$, $Mg(OH)_2$, and $Y_2O_3$. The composition requires a relatively lower peak soak temperature (as compared to conventional alumina ceramics) of about 1320 to about 1400° C., more optimally about 1350 to about 1370° C., and is particularly suited for use in high frequency applications. The resulting sintered compositions exhibit a low dielectric constant (about 10 to about 12, more preferably about 11.5 to about 12); a high Q factor (about 10,000 to about 55,000, more preferably about 30,000 to about 50,000); a low temperature coefficient (about −30 to about 30 ppm/° C., more preferably about −3 to about 1); and a high percent fired density (about 95 to about 100, more preferably about 98.33 to about 99.20).

16 Claims, No Drawings

DIELECTRIC CERAMIC COMPOSITION

FIELD OF THE INVENTION

This invention relates to alumina based dielectric ceramic compositions. Specifically, the invention is an alumina based dielectric ceramic composition exhibiting a low dielectric constant, a high Q factor, a low temperature coefficient, and a high percent fired density. The composition requires a relatively lower peak soak temperature during sintering (as compared to conventional alumina ceramics) and is particularly suited for use in high frequency applications.

BACKGROUND OF THE INVENTION

Dielectric ceramic compositions have found use in the field of electronic communications in such components as filters and resonators. In recent years, the range of frequencies used in electronic communications has expanded so that higher frequencies, i.e., those in the microwave range, are increasingly utilized. A filter may be employed to select a signal within a specific frequency range. The frequency range selected by the filter is referred to as the resonant frequency. Such filters may be based upon a block of dielectric material, often a ceramic material. The resonant frequency of the filter is determined by the dielectric properties of that material and by the dimensions of the block. In general, a dielectric material is required which has a low dielectric loss (indicated by a low dielectric loss factor) in order to minimize energy absorption by the dielectric material that would otherwise reduce resonant signal intensity. The Q factor is defined as the inverse of the dielectric loss factor. Therefore, a relatively lower loss factor results in a relatively higher Q factor. In general, a higher dielectric constant allows the design of a filter with reduced dimensions. For resonant frequencies above about 2 GHz, however, it becomes more difficult to obtain a functional filter because of the small dimensions necessitated by the shorter wavelengths. Thus, a material with a lower dielectric constant, and lower dielectric loss factor (high Q factor), is needed in order to maintain the dimensions of the filter in a range conducive to manufacturing limitations. A percentage fired density approaching 100 also is conducive to achieving a high Q factor.

Conventional dielectric ceramic materials made of alumina or modified alumina do not exhibit sufficiently high Q factor values along with sufficiently low temperature coefficients for satisfactory use as filters and resonators in the microwave frequency band. Additionally, these conventional materials are limited in that they require sintering at relatively high peak soak temperatures of about 1550° C. The peak soak temperature is the maximum (peak) temperature achieved during sintering; it is at this temperature that the material remains (soaks) for a period of time.

Furthermore, under normal operating conditions, a filter is typically subjected to a range of temperatures. As temperature changes, the filter's dimensions are altered by thermal expansion or contraction of the filter material. This results in a shift in resonant frequency. Dielectric properties are affected by a change in temperature, also tending to shift the resonant frequency. The change in resonant frequency caused by a change in temperature is termed the temperature dependence of the resonant frequency. The temperature coefficient ($T_f$) expresses the frequency shift caused by a change in temperature of 1° C. For example, a $T_f$ of +5 means that the resonant frequency shifts upward by five ppm with a temperature change of 1° C. A $T_f$ of −5 means that the resonant frequency shifts downward by five ppm with a temperature change of 1° C. A temperature coefficient approaching zero (0) is preferred to minimize the shift in resonant frequency due to variations in operating temperature.

SUMMARY OF THE INVENTION

The present invention is directed to a dielectric ceramic compound comprising a base material and an additive material. The base material is represented by the general formula: (x) $Al_2O_3$+(y) $TiO_2$, wherein x and y are percentages of the total weight of said base material. The value of x is in the range of about 60 to about 96, with y being in the range of about 4 to about 40. The values of x and y are more preferably in the range of about 94 to about 96 and about 4 to about 6, respectively.

In one embodiment of the invention the additive material comprises $Nb_2O_5$ in an amount from about 0.1 to about 3 weight percent of the total weight of the base material, and is more preferably in an amount from about 0.1 to about 1.

In a second embodiment, the additive material further comprises at least one component selected from the group consisting of $BaCO_3$, $SnO_2$, $Mn_2O_3$, $MnCO_3$, $Mg(OH)_2$, and $Y_2O_3$. When present, the $BaCO_3$ is in an amount from about 0.25 to about 1 weight percent of the total weight of the base material, more preferably in an amount from about 0.25 to about 0.5. When present, the $SnO_2$ is in an amount from about 0.5 to about 1.25 weight percent of the total weight of the base material. When present, the $Mn_2O_3$ is in an amount from about 0.075 to about 0.115 weight percent of the total weight of the base material. When present, the $MnCO_3$ is in an amount from about 0.02 to about 0.1 weight percent of the total weight of the base material. When present, the $Mg(OH)_2$ is in an amount from about 0.005 to about 0.075 weight percent of the total weight of the base material. When present, the $Y_2O_3$ is in an amount from about 0.004 to about 0.03 weight percent of the total weight of the base material, more preferably from about 0.004 to about 0.01.

The dielectric ceramic compositions may be sintered at a peak soak temperature of about 1320 to about 1400° C., more preferably from about 1350 to about 1370° C., for about 4 hours. The resulting sintered compositions exhibit the following improved electrical properties: a dielectric constant (K) from about 10.00 to about 12.00, more preferably from about 11.50 to about 12.00; a percent fired density of about 95 to about 100, more preferably from about 98.33 to about 99.20; a Q factor of about 10,000 to about 55,000, more preferably from about 30,000 to about 50,000; and a temperature dependence ($T_f$) from about −30 to about 30 ppm/° C., more preferably from about −3 to about 1 ppm/° C., within a high frequency range greater than about 2 GHz.

DETAILED DESCRIPTION OF THE INVENTION

The dielectric ceramic composition of the present invention comprises a base material and an additive material.

The base material is represented by the general formula:

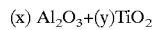
(x) $Al_2O_3$+(y)$TiO_2$ wherein x and y are percentages of the total weight of said base material. The value of x is in the range of about 60 to about 96, with y being in the range of about 4 to about 40. The values of x and y are more preferably in the range of about 94 to about 96 and about 4 to about 6, respectively. Alumina is commonly used in dielectric ceramic compositions utilized in electrical applications, and on its own exhibits a high Q factor. However, on its own alumina may exhibit an unacceptably high (high absolute value) $T_f$ of approximately −55 ppm/° C. Moreover, alumina on its own requires a peak soak temperature during sintering of about 1550° C. Titanium oxide, on its own, also exhibits a relatively high Q factor, but has the disadvantage of having an extremely high $T_f$(absolute value) of approximately +450 ppm/° C.

The additive material in the first embodiment of this invention is $Nb_2O_5$. When the $Nb_2O_5$ is included in an amount from about 0.1 to about 0.3 weight percent, more preferably about 0.1 to about 1, of the total weight of the base material, the composition can be sintered at a peak soak temperature in the range of about 1320 to about 1400° C., more optimally of about 1350 to about 1370° C., for about 4 hours. Moreover, the resulting sintered dielectric ceramic composition had an increased Q factor.

A second embodiment of the invention includes an additive material comprising $Nb_2O_5$ and at least one component selected from the group consisting of $BaCO_3$, $SnO_2$, $Mn_2O_3$, $MnCO_3$, $Mg(OH)_2$, and $Y_2O_3$. The $BaCO_3$ additive lowers the firing temperature, helps densify the fired material to the range of 99–100%, and adjusts the $T_f$ in a positive manner ($T_f$ may be negative or positive). The $SnO_2$ additive lowers the firing temperature, and adjusts the $T_f$ in a positive manner. The $Mn_2O_3$, $MnCO_3$, $Mg(OH)_2$, and $Y_2O_3$ additives lower the firing temperature, and help densify the fired material to the range of 99–100%.

Optimal results are achieved with the following additive compositions: $BaCO_3$ (when present) in the range of about 0.25 to about 1 percent, more preferably about 0.25 to about 0.5; $SnO_2$ (when present) in the range of about 0.5 to about 1.25 percent; $Mn_2O_3$ (when present) in the range of about 0.075 to about 0.115 percent; $MnCO_3$ (when present) in the range of about 0.02 to about 0.1 percent; $Mg(OH)_2$ (when present) in the range of about 0.005 to about 0.075 percent; and $Y_2O_3$ (when present) in the range of about 0.004 to about 0.03 percent, more preferably about 0.004 to about 0.01 percent. All percentages of the additive components are expressed in terms of the total weight of the base material.

Addition of one or more of the above mentioned components allows for a peak soak temperature during sintering of about 1320 to about 1400° C., more optimally of about 1350 to about 1370° C. The resulting sintered dielectric ceramic compositions exhibit the following improved electrical properties: dielectric constant in the range of about 10 to about 12, more preferably from about 11.5 to about 12; a percent fired density of about 95 to about 100, more preferably from about 98.33 to about 99.20; a Q factor of about 10,000 to about 55,000, more preferably from about 30,000 to about 50,000; and a temperature coefficient ($T_f$) from about −30 to about 30 ppm/° C., more preferably from about −3 to about 1, within a high frequency range greater than about 2 GHz.

An important feature of this invention is the lowered peak soak temperature necessary for sintering the dielectric ceramic composition. A lowered peak soak temperature provides energy savings, decreases ramp up time, and provides added flexibility in the manufacturing process. Other important features of this invention are the achievement of a dielectric constant between 10–12, a high Q factor, a $T_f$ approaching zero (0), and a high percent fired density. Optimization of these features results in a dielectric ceramic composition particularly suited for use as an electrical component in the high frequency range.

A dielectric ceramic composition in accordance with the invention can be manufactured as follows:

Raw materials are weighed out according to the weight percentages listed in Table 1 and Table 2, based on a 530 gram total batch size. Weighing is performed on a Mettler-Toledo PM 300000K scale (Worthington, Ohio). Ball mill mixing is used to disperse and mix the raw materials. Deionized water is added at 42 weight % (223 g) of the total batch weight, and Tamol 963 (Rohm and Haas Corporation, Montgomeryville, Pa.) dispersant is added at 1 weight % (5.30 g) of the total batch weight. The ball mills are 0.03 gallon size, rubber lined and from U.S. Stoneware, East Palestine, Ohio. Both alumina media (U.S. Stoneware) and zirconia media (Zircoa, Solon, Ohio) are used with diameter sizes ranging from between 0.25 to 0.50 inches. The mill media charge is between 50–55 volume %. The ball mill is run for between 4 and 6 hours.

The slurry is dried overnight in teflon pans at 110° C. to a hard cake. The cakes are broken up and mixed with 1% weight PVA (Air Products, Allentown, Pa.), and 1.2 weight % PEG 200 (Union Carbide, Danbury, Conn.) using a mortar and pestle. No calcining is necessary. The material is passed through a 60 mesh screen to prepare for pressing. Cylindrical pucks are pressed to 20,000 pounds on a 1.1 inch diameter die. Heights will range between 0.50 and 1.0 inches. Target green densities are between 2.20–2.30 g/cm³, and target fired densities are between 3.90 and 4.00 g/cm³. The pucks are fired in a Thermolyne, High Temperature Lab Kiln, Model #46200 from Dubuque, Iowa. The pucks follow a basic firing profile including a binder burnout stage, and reasonable ramp rates between 2° and 10° C. per minute. Peak soak temperatures range between 1350° and 1400° C. for a 4 hour soak time. Actual temperature is tracked using Philips Components High Temperature Control Rings (range 1130–1400° C.).

Electrical properties of the Haake-Coleman cylinders are measured on a Hewlett-Packard 3853C 6 GHz analyzer (HP Palo-Alto, Calif.) using the Haake Coleman parallel plate technique. Measured parameters are: dielectric constant (K), Q factor, and temperature coefficient ($T_f$), as well as density.

TABLE 1

Composition Range of First Embodiment

| component | High % | Low % |
| --- | --- | --- |
| BASE MATERIAL | | |
| $Al_2O_3$ | 60 | 96 |
| $TiO_2$ | 4 | 40 |
| ADDITIVE MATERIAL | | |
| $Nb_2O_5$* | 0.1 | 0.3 |

*Weight Percent expressed in percentage of total weight of base material.

TABLE 2

Composition Range of Second Embodiment

| | BASE MATERIAL | | | |
| --- | --- | --- | --- | --- |
| | Range | | More Preferably | |
| component | High % | Low % | High % | Low % |
| $Al_2O_3$ | 60 | 96 | 94 | 96 |
| $TiO_2$ | 4 | 40 | 4 | 6 |

TABLE 2-continued

Composition Range of Second Embodiment

| | ADDITIVE MATERIAL | | | |
|---|---|---|---|---|
| | Widest Range | | More Preferable Range | |
| component | High % | Low % | High % | Low % |
| Nb$_2$O$_5$* | 0.1 | 0.3 | 0.1 | 1 |
| BaCO$_3$*★ | 0.25 | 1 | 0.25 | 0.5 |
| SnO$_2$*★ | 0.5 | 1.25 | — | — |
| Mn$_2$O$_3$*★ | 0.75 | 0.115 | — | — |
| MnCO$_3$*★ | 0.02 | 0.1 | — | — |
| Mg(OH)$_2$*★ | 0.005 | 0.075 | — | — |
| Y2O$_3$*★ | 0.004 | 0.03 | 0.004 | 0.01 |

*Weight Percent expressed in percentage of total weight of base material.
★At least one of these components must be present.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A dielectric ceramic composition comprising (a) a base material represented by the general formula $$(x)Al_2O_3 + (y)TiO_2$$

wherein x and y are percentages of the total weight of said base material, with x being in the range of about 60 to about 96 and y being in the range of about 4 to about 40;

(b) a first additive material comprising Nb$_2$O$_5$ in an amount having a weight within the range of about 0.1 to about 3 percent of said total weight of said base material; and (c) a second additive material, the second additive material comprising at least one component selected from the group consisting of BaCO$_3$, SnO$_2$, Mn$_2$O$_3$, Mg(OH)$_2$ and Y$_2$O$_3$.

2. A dielectric ceramic composition as defined in claim 1 wherein x is in the range of about 94 to about 96, and y is in the range of about 4 to about 6.

3. A dielectric ceramic composition as defined in claim 1 wherein said Nb$_2$O$_5$ has a weight within the range of about 0.1 to about 1 percent of said total weight of said total weight of said base material.

4. A dielectric ceramic composition as defined in claim 1, wherein said BaCO$_3$, when present, is in the range of about 0.25 to about 1 percent; said SnO$_2$, when present, is in the range of about 0.5 to about 1.25 percent; said Mn$_2$O$_3$, when present, is in the range of about 0.075 to about 0.115 percent; said MnCO$_3$, when present, is in the range of about 0.02 to about 0.1 percent; said Mg(OH)$_2$, when present, is in the range of about 0.005 to about 0.075 percent; and said Y$_2$O$_3$, when present, is in the range of about 0.004 to about 0.03 percent, all percentages in terms of said total weight of said base material.

5. A sintered dielectric ceramic composition produced by sintering the composition comprising (a) a base material represented by the general formula $$(x)Al_2O_3 + (y)TiO_2$$

wherein x and y are percentages of the total weight of said base material, with x being in the range of about 60 to about 96 and y being in the range of about 4 to about 40;

(b) a first additive material comprising Nb$_2$O$_5$ in an amount having a weight within the range of about 0.1 to about 3 percent of said total weight of said base material; and, (c) a second additive material, the second additive material comprising at least one component selected from the group consisting of BaCO$_3$, SnO$_2$, Mn$_2$O$_3$, Mg(OH)$_2$ and Y$_2$O$_3$.

6. A sintered dielectric ceramic composition as defined in claim 5 wherein a dielectric constant of said sintered dielectric ceramic composition is in the range of about 10 to about 12.

7. A sintered dielectric ceramic composition as defined in claim 6 wherein said dielectric constant is in the range of about 11.5 to about 12.

8. A sintered dielectric ceramic composition as defined in claim 5 wherein a Q value of said sintered dielectric ceramic composition is in the range of about 10,000 to about 55,000.

9. A sintered dielectric ceramic composition as defined in claim 8 wherein said Q value is in the range of about 30,000 to about 50,000.

10. A sintered dielectric ceramic composition as defined in claim 5 wherein a temperature coefficient of said sintered dielectric ceramic composition is in the range of about −30 to about 30 ppm/° C.

11. A sintered dielectric ceramic composition as defined in claim 10 wherein said temperature coefficient is in the range of about −3 to about 1 ppm/° C.

12. A sintered dielectric ceramic composition as defined in claim 5 wherein a percent fired density of said sintered dielectric ceramic composition is in the range of about 95 to about 100.

13. A sintered dielectric ceramic composition as defined in claim 12 wherein said percent fired density is in the range of about 98.33 to about 99.20.

14. A sintered dielectric ceramic composition as defined in claim 5 wherein said sintering is performed at a peak soak temperature in the range of about 1320 to about 1400° C.

15. A sintered dielectric ceramic composition as defined in claim 14 wherein said peak soak temperature is in the range of about 1350 to about 1370° C.

16. A sintered dielectric ceramic composition as defined in claim 5, wherein said BaCO$_3$, when present, is in the range of about 0.25 to about 1 percent; said SnO$_2$, when present, is in the range of about 0.5 to about 1.25 percent; said Mn$_2$O$_3$, when present, is in the range of about 0.075 to about 0.115 percent; said MnCO$_3$, when present, is in the range of about 0.02 to about 0.1 percent; said Mg(OH)$_2$, when present, is in the range of about 0.005 to about 0.075 percent; and said Y$_2$O$_3$, when present, is in the range of about 0.004 to about 0.03 percent, all percentages in terms of said total weight of said base material.

* * * * *